United States Patent [19]

Kikuchi et al.

[11] Patent Number: 4,788,680
[45] Date of Patent: Nov. 29, 1988

[54] METHOD OF SELECTING TIME SLOT IN TIME DIVISION SWITCHING NETWORK AND APPARATUS THEREFOR

[75] Inventors: Susumu Kikuchi; Katsumi Otani, both of Yokohama; Takeaki Yamamoto, Iruma, all of Japan

[73] Assignees: Hitachi, Ltd.; Nippon Telegraph & Telephone Corp., both of Tokyo, Japan

[21] Appl. No.: 15,626

[22] Filed: Feb. 17, 1987

[30] Foreign Application Priority Data

Feb. 28, 1986 [JP] Japan ................... 61-41816

[51] Int. Cl.$^4$ ........................... H04Q 11/04
[52] U.S. Cl. ........................... 370/68
[58] Field of Search ............ 370/68, 66, 84, 58

[56] References Cited

U.S. PATENT DOCUMENTS

| | | | |
|---|---|---|---|
| 3,740,480 | 6/1973 | Krupp et al. | 370/68 |
| 4,078,228 | 3/1978 | Miyazaki | 370/66 |
| 4,516,240 | 5/1985 | Kume et al. | 370/68 |
| 4,633,460 | 12/1986 | Suzuki et al. | 370/66 |
| 4,633,461 | 12/1986 | Banton et al. | 370/58 |

FOREIGN PATENT DOCUMENTS

| | | | |
|---|---|---|---|
| 202205 | 11/1986 | European Pat. Off. | 370/60 |
| 58-38094 | 3/1983 | Japan | 370/58 |
| 60-41386 | 3/1985 | Japan | 370/66 |
| 61-96898 | 5/1986 | Japan | 370/58 |

OTHER PUBLICATIONS

"A Multi-Slot Call Connection Method for Broadband Digital Switching", by Asano et al., pp. 13–18, Jan. 18, 1985.

"Time Slot Sequence Integrity of Multi-Slot Information in a Digital Network", by Egawa et al., pp. 57–63, May 23, 1980.

Primary Examiner—A. D. Pellinen
Assistant Examiner—Geoffrey S. Evans
Attorney, Agent, or Firm—Antonelli, Terry & Wands

[57] ABSTRACT

A time slot selecting method applied to a time division switch in a time division switching network having multi-stage tandem connected time division switches. A controller associated with an upstream time division switch selects an outgoing idle time slot for multi-slot information in accordance with a predetermined time slot selecting order in a manner that the number of combinations of time slots selectable by a downstream time division switch becomes large. Thus, the range of selecting time slots by a downstream time division switch becomes broadened while ensuring the sequence integrity of multi-slots in a frame and hence a path blocking rate is reduced.

10 Claims, 9 Drawing Sheets

| | NO | $a_1$ | $a_2$ | IDLE/BUSY |
|---|---|---|---|---|
| LARGE | 1 | 29 | 30 | 0 |
| | 2 | 28 | 30 | 0 |
| | 3 | 28 | 29 | 1 |
| | 4 | 27 | 30 | 0 |
| Z | ⋮ | ⋮ | ⋮ | ⋮ |
| | 434 | 2 | 30 | 1 |
| SMALL | 435 | 1 | 30 | 1 |

IDLE/BUSY { 0 : BUSY, 1 : IDLE }

SEARCH DIRECTION

METHOD OF SELECTING TIME SLOT IN TIME DIVISION SWITCHING NETWORK AND APPARATUS THEREFOR

BACKGROUND OF THE INVENTION

1. Field of the Invention

The present invention relates to a method of selecting time slots in a time division switching network and an apparatus therefor, and more particularly to a multi-slot information processing method for preserving the sequence integrity of multi-slot information in a frame in a time division switching system which uses a plurality of time division switches connected in tandem.

2. Description of the Prior Art

Telephone voice at 64 kb/s is transmitted using a time slot (8 bits) at intervals of 8 KHz sampling frequency. Therefore, $n \times 64$ kb/s broad band information is transmitted using n time slots. In this case, the sequence integrity of n time slots in a frame becomes important. For example, if a communication terminal at 128 kb/s (e.g., still image terminal) is used, two time slots ($2 \times 64$ kb/s) are require for such communication. A switching connection for such a communication is called a referred to as multi-slot switching. In multi-slot switching, information sent from an orginating side by dividing it into two time slots must be assembled correctly at a terminating side, thus the sequence of two time slots must be controlled so as not to become reversed at the terminating side. In addition, it is necessary for a switching connection in a communication using a general terminal not to divide information within a single frame into two frames. This is called "sequence integrity of multi-slots in a frame".

A control method for ensuring the sequence integrity of multi-slots in a frame is described, for example, in "A Multi-slot Call Connection Method for Broadband Digital Switching", pp. 13 to 18, SE84-131 of Report on Technical Study (Switching) by The Institute of Electronics and Communication Engineers of Japan. Specifically, at page 16, the time slot sequence integrity in a frame is detailed.

However, such conventional technique manages the time slot sequence integrity in a frame only with respect to a single exchange. In actual communication where a plurality of tandem connected exchanges are used, the conventional technique does not give consideration to reduction of a path blocking rate while preserving the sequence integrity of multi-slots in a frame.

Even if time division switches are constructed as a complete switch group in case of switching connection in units of one time slot, they become an incomplete switch group in case of switching connection of multi-slots while preserving the sequence integrity. Thus, it is important to reduce blocking rate in a digital communication network handling multi-slot information. The blocking rate changes greatly depending on the arrangement of multi-slot information on an incoming highway. Therefore, if selection of time slots at the time division switch of an upstream exchange is not proper, all the time slots at the time division switch at a downstream exchange, which preserve the sequence integrity in a frame, may be in a busy state even if idle time slots are present. Thus, a path blocking occurs.

SUMMARY OF THE INVENTION

It is an object of the present invention to provide a method of selecting time slots and an apparatus therefor, which can reduce the path blocking rate in such a manner that the time division switch of an upstream exchange selects time slots in such a manner that the time division switch of a downstream exchange can have a broad selection range of time slots which ensure the time sequence integrity of multi-slots in a frame.

It is another object of the present invention to provide a method of selecting time slots and an apparatus therefor, which can perform a connection process for multislots in a simple way and economically.

To achieve the above objects of the present invention, in selecting outgoing time slots at the time division switch of an upstream exchange, idle time slots are selected in accordance with a predetermined time slot selecting order. This is accomplished in such a manner that a large number of combinations of outgoing time slots at the time division switch of a downstream exchange ensure the time sequence integrity of multi-slots in a frame.

The idle time slots are selected using a method of selecting time slots based on a combination map of a time slot group associated with the number of multi-slots; a method of selecting the nearest idle time slot to a predetermined time slot; a method of selecting an idle time slot nearer to the frame end with respect to a center time slot within the frame; or other methods.

BRIEF DESCRIPTION OF THE DRAWINGS

FIGS. 5 and 6 show examples of time slot conversion while ensuring the time sequence integrity in a frame, wherein

FIGS. 7 and 8 show examples of time slot conversion which does not ensure the time sequence integrity in a frame, wherein

DESCRIPTION OF THE PREFERRED EMBODIMENTS

Figure 1:
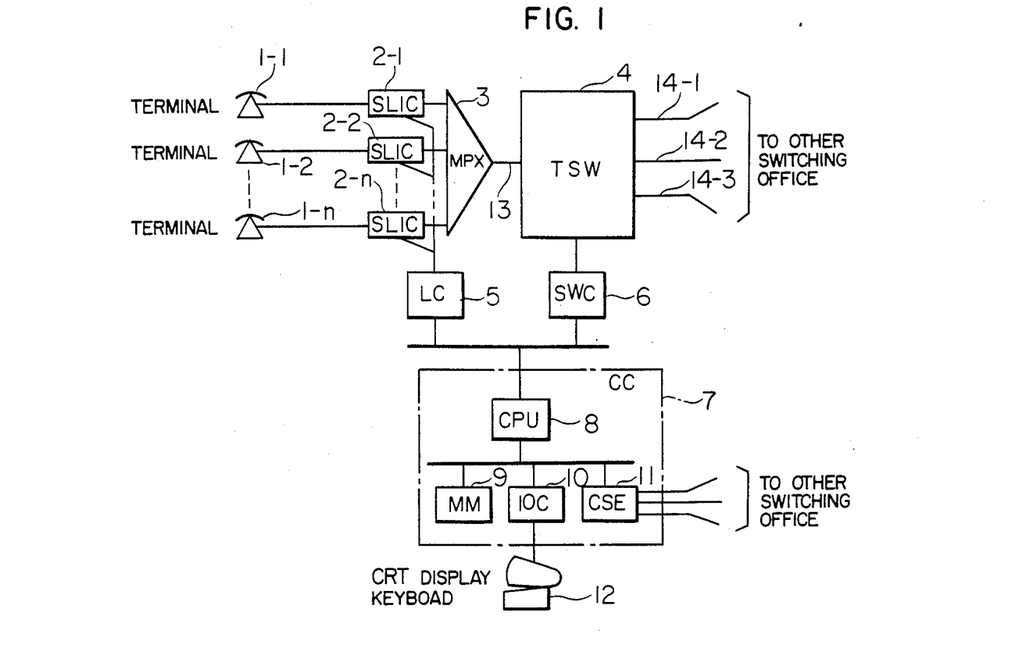
FIG. 1 shows an example of the arrangement of a time division digital switching system.

FIG. 1 shows an example of the arrangement of a time division digital switching system (hereinafter abbreviated as TDSS). Voice information or data from terminals 1-1 to 1-n is converted from analog signal into digital signal at subscriber line interface circuits SLIC 2-1 to 2-n, and multiplexed by a multiplexer MPX 3. A time division switch (time switch) TSW 4 distributes the multiplexed signal inputted from an incoming highway 13 to connect it to an outgoing highway or highways 14-1 to 14-3 which are routed to desired destinations. The distribution process is executed when a central controller CC 7 issues a path order to time division switch TSW 4 via a switch controller SWC 6. To this end, central controller CC 7 functions to receive a dial signal from subscriber line interface circuits SLIC 2-1 to 2-n via a line controller LC 5, or manage the idle/busy state of outgoing highways 14-1 to 14-3. These functions are realized when a processor CPU 8 executes programs stored in a memory MM 9 in central controller CC 7. An input/output controller IOC 10, a CRT display, and a keyboard 12 constitute a man-machine interface means between a maintenance craftsman and time division digital switching system TDSS. A common channel signaling equipment CSE 11 receives and sends a dial signal, a response signal, a disconnect signal and the like to and from other switching offices.

Figure 2:
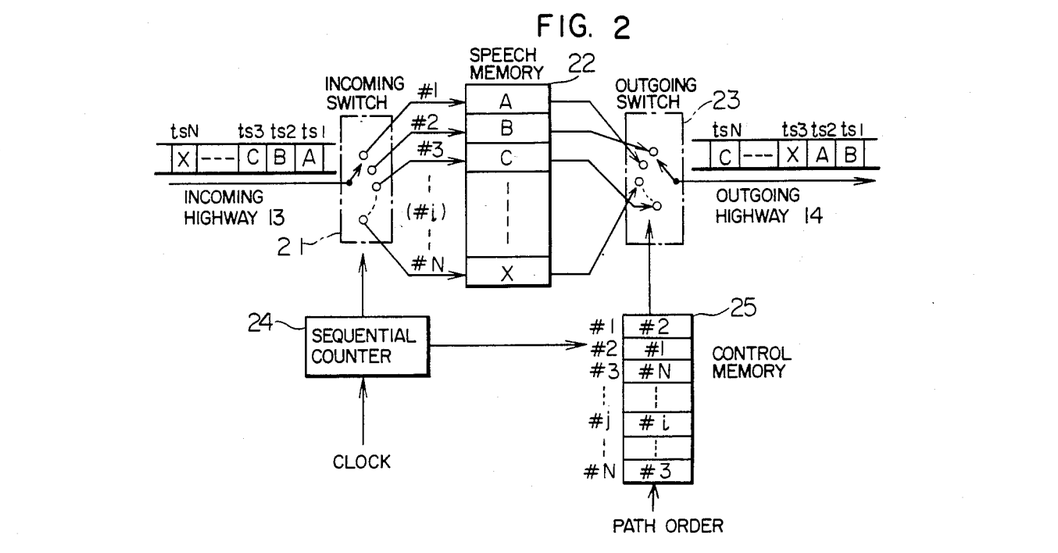
FIG. 2 illustrates the principle of the time division switch of FIG. 1.

FIG. 2 shows the principle of a time division switch (TSW of FIG. 1) which is a characteristic element in a TDSS. Information allocated to each time slot on an incoming highway 13 is sequentially written in a speech memory 22 by an incoming switch 21. A sequential counter controls incoming switch 21. The signal written in speech memory 22 is disposed on time slots of a desired outgoing highway 14 by an outgoing switch 23. To which time slot the signal is to be read is stored in a control memory 25. Outgoing switch 23 operates based on this storage content and the output from sequential counter 24, to thereby dispose the information on desired outgoing time slots, synchronize incoming and outgoing time slots, and prevent contention therebetween. The storage content of the control memory is updated, as described previously, upon reception of a path order from switch controller SWC 6 of FIG. 1 to time division switch TSW 4.

In the example of FIG. 2, information (A) of incoming time slot ts1 is applied to outgoing time slot ts2, information (B) of incoming time slot ts2 is applied to outgoing time slot ts1, information (C) of incoming time slot ts3 is applied to outgoing time slot tsN, and information (X) of incoming time slot tsN is applied to outgoing time slot ts3.

Figure 3:
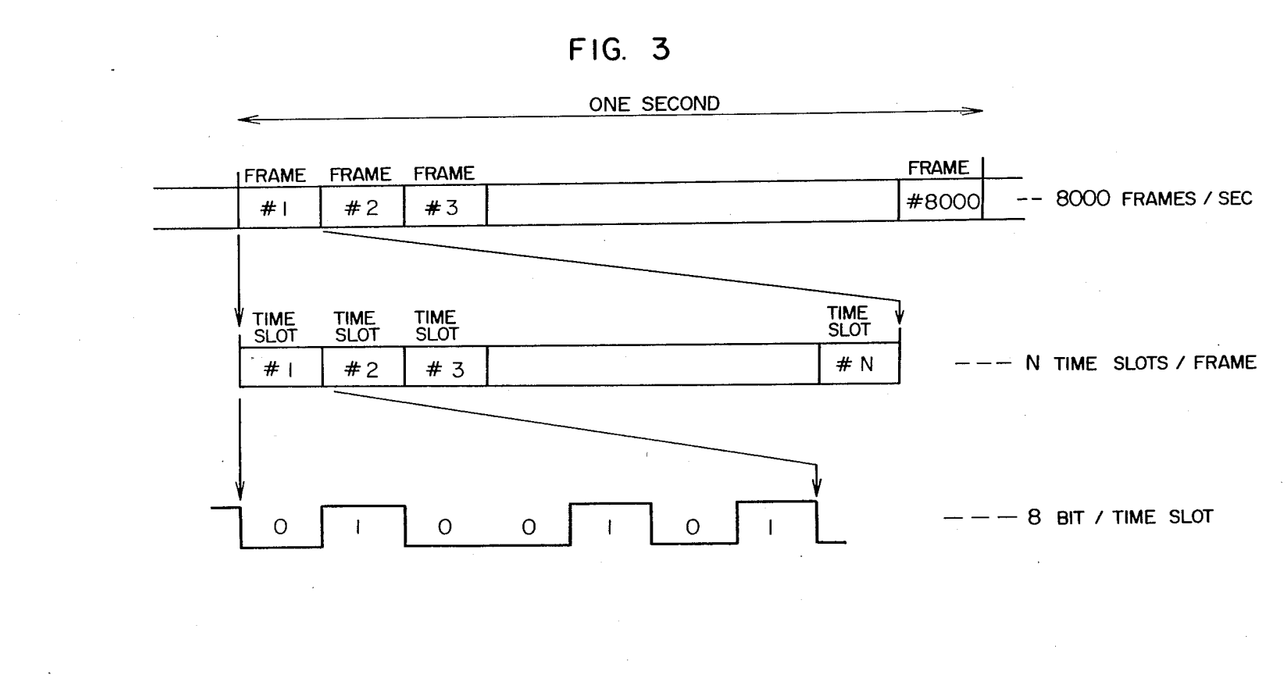
FIG. 3 shows an example of a frame format of a digital line circuit using 64 kb/s as its basic unit.

FIG. 3 shows an example of a frame structure of a digital line circuit using 64 kb/s (which corresponds to one voice channel) as a basic unit. 8000 frames are repeated per one second, each frame being constructed of N time slots and one time slot being constructed of 8 bits. As a result, each time slot transmits information at 64 kb/s which is a switching unit of a time division switching system. Information on incoming and outgoing time slots 13 and 14 of FIG. 2 has the same structure. Time division switch 4 of TDSS re-allocates, as described previously, incoming and outgoing information in units of a time slot, thereby connecting the information to a desired destination.

Figure 4:
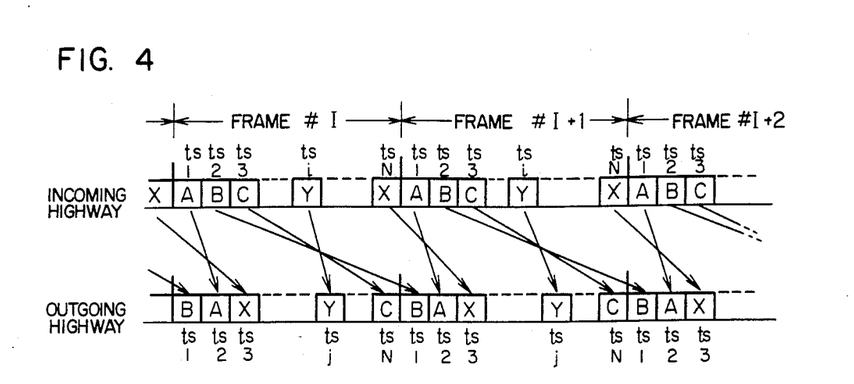
FIG. 4 shows the relationship between incoming and outgoing time slots at a switched state shown in FIG. 2.

FIG. 4 shows the relationship between incoming and outgoing time slots as switched as described with reference to FIG. 2. Each information unit A, B, C, Y and X on respective incoming time slots ts1, ts2, ts3, tsi and tsN of frame #I, is converted into ts2 of an outgoing frame #I, ts1 of frame #I+1, tsN of frame #I, and ts3 of frame #I+1, respectively. This relationship is indicated by arrows connecting the upper and lower frames. In the Figure, it is to be noted that arrows are always inclined downward to the right. In the Figure, a lapse of time progresses from the left to the right so that an inclination downward to the right of an arrows means that information on incoming time slots is always allocated to the later outgoin time slots, or in some cases information on time slots of an incoming frame #I is allocated to time slots of an outgoing frame #I+1. The conditions of such allocation are determined based on the relationship between the incoming time slot number tsi and the outgoing time slot number tsj, as in the following.

(1) if $tsi < tsj$, both incoming and outgoing time slots are within the same frame.
(2) if $tsi \geq tsj$, outgoing time slots are allocated within the frame whose number is the incoming frame number+1.

Depending on the hardware, the above relations may be biased as of $tsi < tsj + k$ and $tsi \geq tsj + k$ (k is the constant number of time slots).

The above performance is originated from the fact that the characteristic element of the TDSS, i.e., a time division switch, repeats a read/write of time slots with respect to the speech memory using one frame as a read/write period. Inclination downward to the right of arrows is an indication that the information on each time slot is first written and then read. The time required for writing the time slot information and reading it is not constant, but it depends on the relationship between incoming time slot tsi and outgoing time slot tsj. Thus, as appreciated from FIG. 2, the order of information on an incoming highway changes at an outgoing highway. If terminals 1-1 to 1-n shown in FIG. 1 are voice communication terminals, such as telephone sets, this communication is conducted in units of one time slot (64 kb/s) so that it makes no difference whether the order between time slots is changed or not.

However, if there is a terminal communicating, for example, at 128 kb/s (e.g., still image terminal) among terminals 1-1 to 1-n of FIG. 1, two time slots are necessary for such communication (2×64 kb/s). In multi-switching for switching and connecting such communication, it is necessary to ensure the sequence integrity of multi-slots in a frame.

Figure 5:
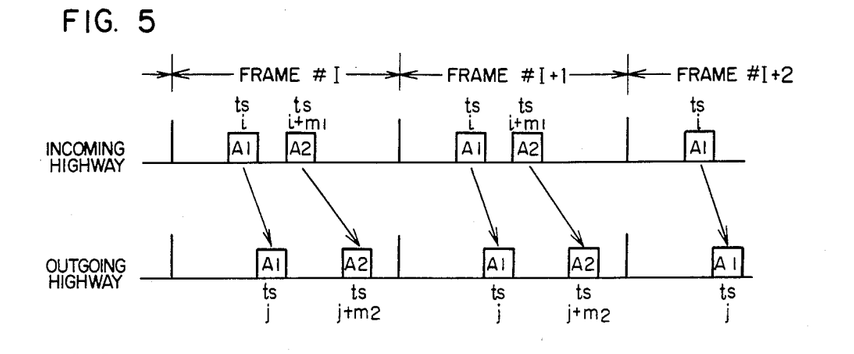
FIG. 5 shows a conversion between the same frames.
Figure 6:
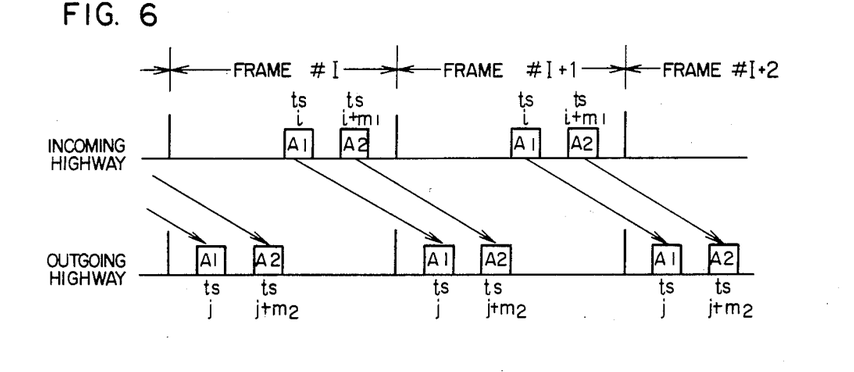
FIG. 6 shows a conversion to the frame delayed by one.
Figure 7:
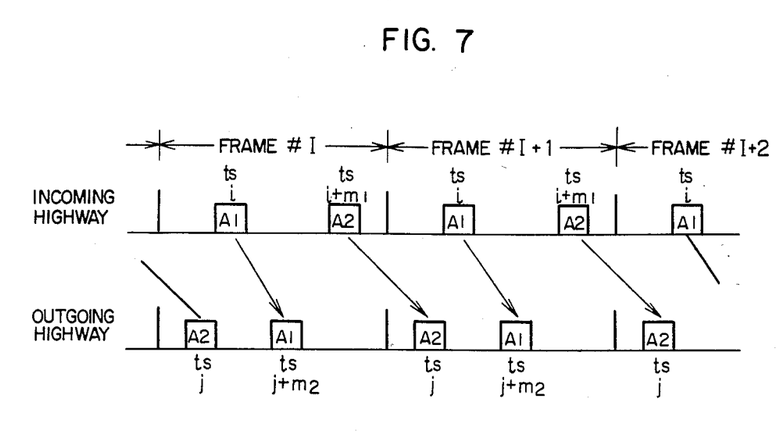
FIG. 7 shows a conversion from incoming multi-slots in a frame to outgoing multi-slots in plural frames.
Figure 8:
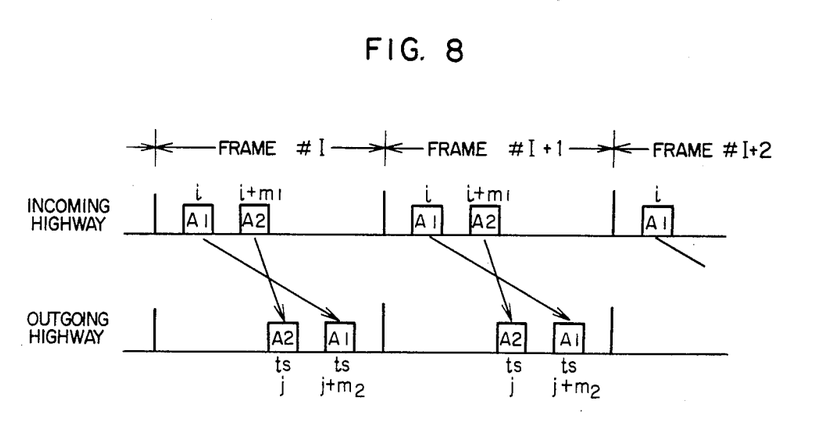
FIG. 8 shows a conversion in which the order of multi-slots in the same frame is reversed.

FIGS. 5 and 6 show examples of time slot conversion between information A1 and A2 sent from a terminal, while ensuring the time slot sequence integrity in a frame, wherein FIG. 5 shows a conversion of time slots within the same frame both at incoming and outgoing sides of a time division switch, and FIG. 6 shows a conversion of time slots between an incoming frame and an outgoing frame delayed by one relative to the incoming frame. In both cases, the information is allocated within a single frame and the time slot sequence is not changed. On the contrary, FIGS. 7 and 8 show examples of time slot conversion wherein the time slot sequence integrity within frames is not ensured. FIG. 7 shows a conversion wherein, although the time slot sequence is not changed, two informations within a same incoming frame is separated into two frames, and FIG. 8 shows a conversion wherein, although incoming and outgoing information is within a single frame, the time slot sequence is reversed.

Figure 9:
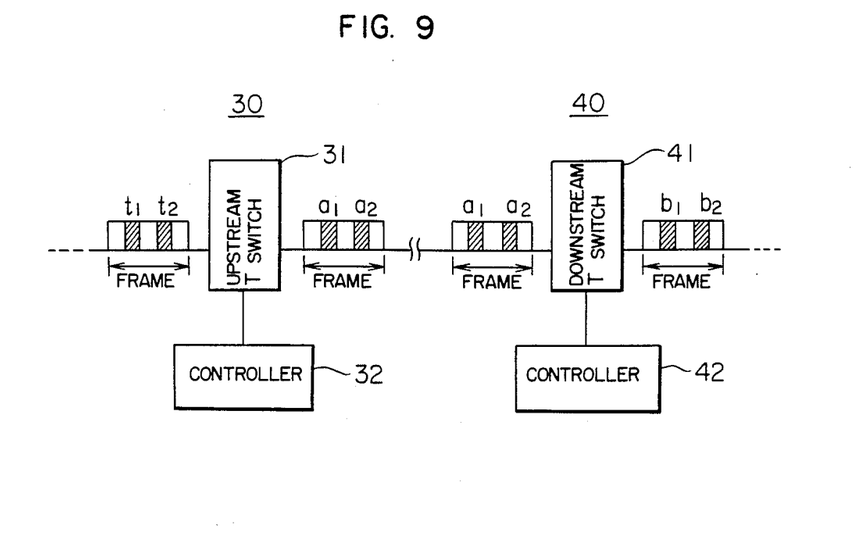
FIG. 9 shows a part of a communication network constructed of a multi-stage time division digital switching system.

FIG. 9 shows a part of a communication network constructed of a multi-stage time division switching system, wherein two exchanges 30 and 40 are connected in tandem via time division switches (T switch). An upstream time division switch 31 of FIG. 9 corresponds oo time division switch TSW 4 of FIG. 1, and a controller 32 of FIG. 9 corresponds to central controller CC 7 of FIG. 1. Similarly, a downstream time division switch 41 of FIG. 9 corresponds to TSW 4 of FIG. 1, and a controller 42 corresponds to central controller CC 7. In FIG. 9, incoming multi-slot information t1 and t2 on the left side of time division switch 31 is allocated to outgoing time slots a1 and a2 while ensuring the time slot sequence integrity in a frame. The information on time slots a1 and a2 is applied to time division switch 41 and allocated to outgoing time slots b1 and b2 while ensuring the time slot sequence integrity in a frame.

In this case, if allocation of information to time slots by upstream time division switch 31 of FIG. 9 is not proper, downstream time division switch 41 may sometimes fail to allocate the information of time slots a1 and a2 while preserving the time slot sequence integrity in a frame. Specifically, even if there are more than two outgoing idle time slots at switch 41, time slot conversion as shown in FIGS. 5 and 6 is not available, but a conversion as shown in FIGS. 7 and 8 is only available while not preserving the time slot sequence integrity.

Figure 10:
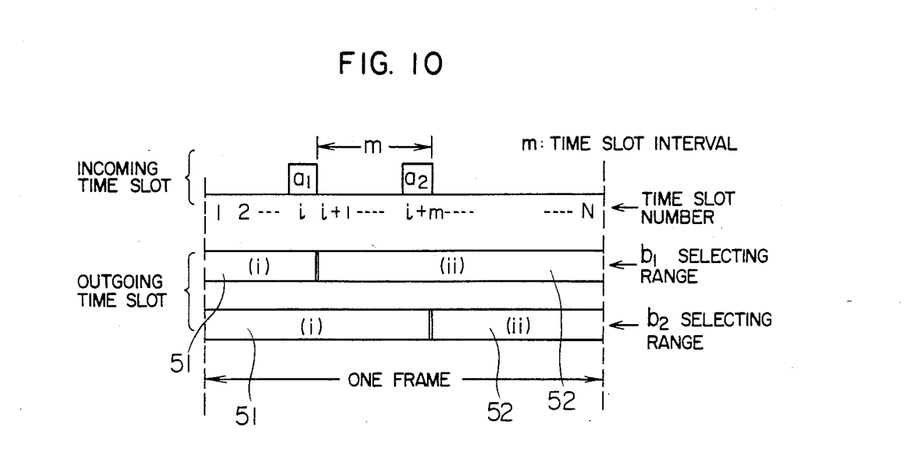
FIG. 10 illustrates the conditions required for ensuring the sequence integrity of time slots in a frame, in case of a two-slot connection process.

FIG. 10 shows a selection range of outgoing time slots which ensure the time slot sequence integrity in a frame. The conditions meeting the time slot sequence integrity are that the sequence of multi-slots at the incoming and outgoing sides of a time division switch (T switch) be preserved and that incoming multi-slots within the same frame should not be separated into plural outgoing frames.

Consequently, assuming that two-slot information is used, the incoming time slot numbers at a time division switch (T switch) are a1, a2, and the corresponding outgoing time slot numbers are b1 and b2, then the following conditions must be met:

[a1<b1 and a2<b2] or [a1≧b1 and a2≧b2]

wherein a1<a2 and b1<b2. Namely, b1 and b2 must be selected from the same region (i) or (ii), (51 or 52) of FIG. 10.

Next, the number of combinations of an outgoing time slot group will be described. Referring to FIG. 10, the number Z of combinations of b1 and b2 selectable by a time division switch is given by the following equation:

$$Z = \text{(combinations at 51)} + \text{(combinations at 52)} \quad (1)$$
$$= ((i + m)C_2 - mC_2) + ((N - i)C_2 - mC_2$$
$$= i^2 + i(m - N) + (N^2 - N - m^2 + m)/2$$

wherein

N: the number of time slots in one frame
i: the position on an incoming time slot of the first element a1 of two-slot information
m: a time slot interval between the first element a1 and the second element a2 of two-slot information.

Figure 11:
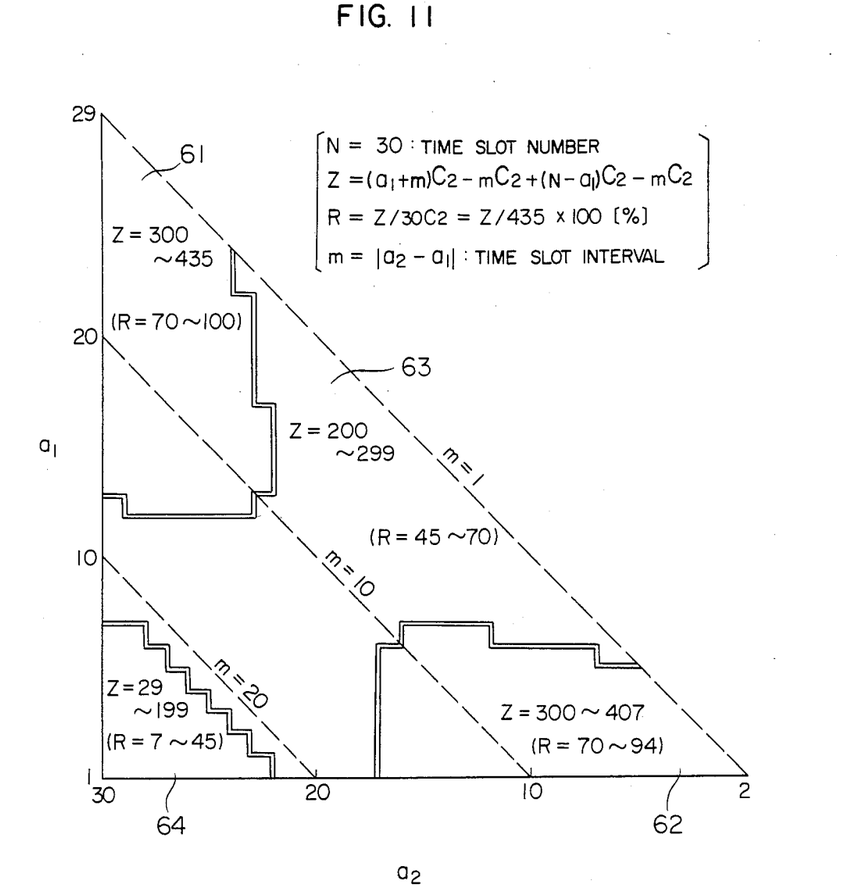
FIG. 11 shows the distribution of the number of combinations of outgoing time slots selectable by a time division switch, using the incoming time slots as the parameters.

Referring to FIG. 11, the number Z of combinations of an outgoing time slot group is solved using the equation (1), and its distribution are shown wherein N=30, the ordinate and the abscissa are incoming time slot a1 and a2, respectively. Z is the largest at region 1 indicated by 61 and at region 2 indicated by 62, and the next largest at region 3 indicated by 63, and the smallest at region 4 indicated by 64. Summarizing this distribution, it can be said that "the value Z becomes large as the interval between incoming time slots is short and the incoming time slots become near to opposite ends of a frame". In FIG. 11, R denotes a ratio of the selectable combinations to the whole combinations.

As discussed above, the number Z of combinations of an outgoing time slot group, which ensures the sequence integrity of multi-slots in a frame, is determined from the positional relationship of incoming time slots and varies to a large extent. A method of reducing a path blocking rate using the above performance in processing a path selection, will be described.

In FIG. 9, time slots are selected by time division switch (T switch) 31 of upstream switch 30 under control of the corresponding controller 32 using the following method so as to make the number of combinations of time slots selectable by time division switch (T switch) 41 of downstream switch 40 while preserving the sequence integrity of multi-slots in a frame.

First, according to a first method, incoming time slots a1 and a2 are selected to make large the number of combinations of time slots selectable by downstream time division switch 41. Particularly, the relation set by the equation (1) is used.

Figure 12:
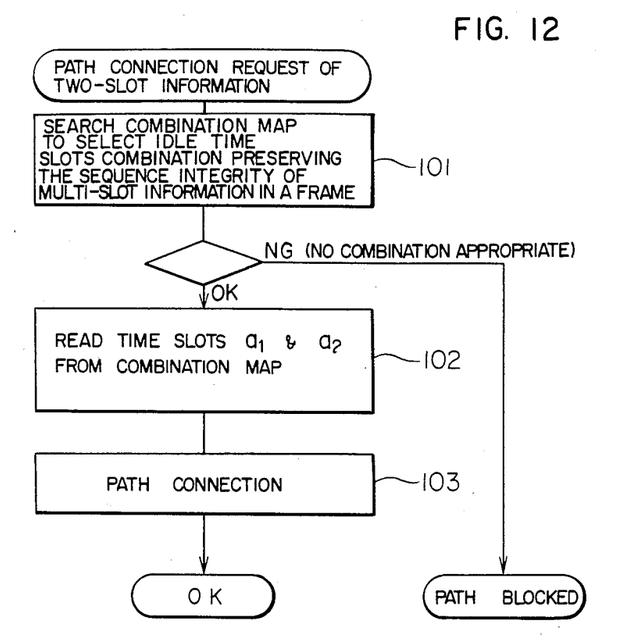
FIG. 12 is a flow chart showing a time slot selecting method according to a first embodiment of the present invention.
Figure 13:
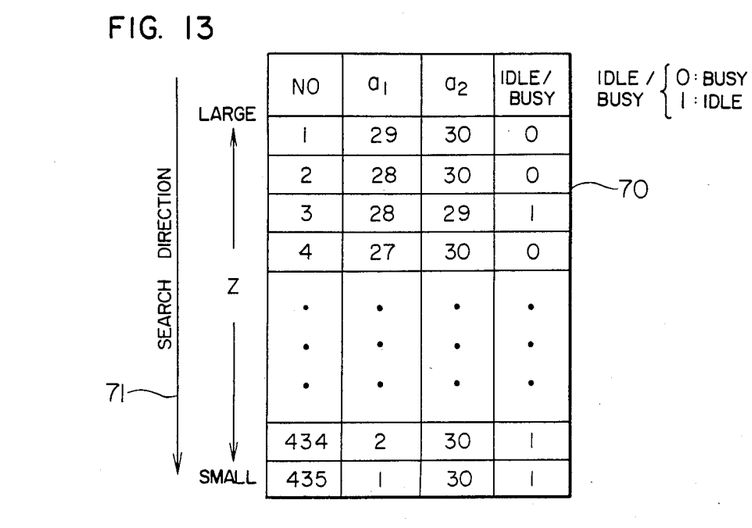
FIG. 13 shows an example of a combination map with a search direction indicated, which map is used with the control shown in FIG. 12.

The first method is shown in the flow chart of FIG. 12. Particularly, the combinations of a1 and a2 and its idle/busy state is formed beforehand in a map as indicated by 70 in FIG. 13, in the order from the region with a large combination number Z to the region with a smaller one (in the order of regions 1, 2→region 3→region 4), based on the equation (1). The map is stored in memory 9 of FIG. 1. Thereafter, upon reception of control information requesting a path connection of twoslot information from an incoming ighway, processor 8 searches the map in the search direction 71 shown in FIG. 13 in the order of increasing number (101). If an idle combination which preserves the sequence integrity of multi-slot information in a frame, is found, time slot numbers a1 and a2 are read (102) to issue a path order to the control memory 25 of FIG. 2 via switch controller SWC 6 and conduct a path connection (103). Thereafter, the idle/busy state area of the selected combination time slots in the combination map 70 of FIG. 13 is changed from "1" to "0" (i.e., from idle to busy). For instance, in a case where an idle time slot combination (a1, a2)=(28, 29), No. 3 of FIG. 13, is selected, the time slot numbers (28, 29) are read to execute a path connection and the bits of the idle/busy state area of the No. 3 time slot combination are changed from "1" to "0". In addition, other idle/busy state areas of the combinations including the time slot numbers 28 and 29 are changed from "1" to "9".

Next, second and third methods will be described wherein the equation (1) is not used in a strict sense but the qualitative result obtained therefrom is used, i.e., a tendancy that the combination number Z becomes large as the interval between the incoming time slots a1 and a2 becomes narrower and as the incoming time slots became spaced from the center time slot of the frame, is used.

Figure 14:
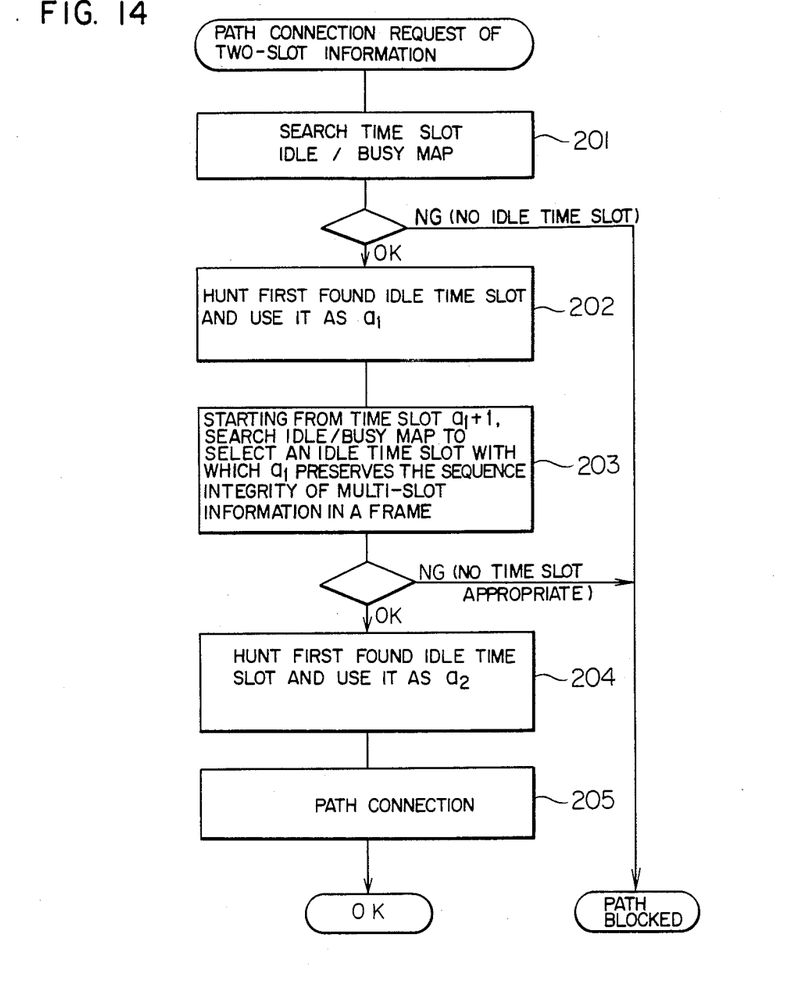
FIG. 14 is a flow chart showing a time slot selecting method according to a second embodiment of the present invention.
Figure 15:
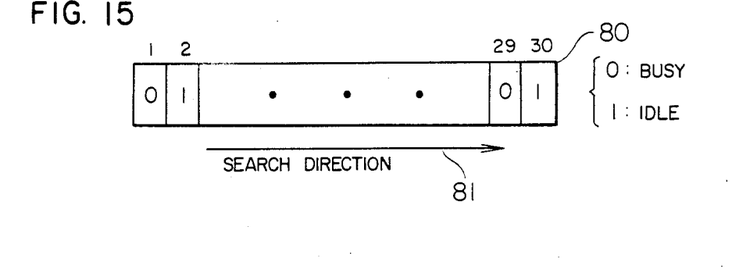
FIG. 15 shows an example of a time slot idle/ busy map with a search direction indicated, which map is used with the control shown in FIG. 14.

According to the second method, as shown in FIG. 14, a time slot idle/busy map (map 80 of FIG. 15) is searched in the order of the increasing number in the search direction 81 indicated in FIG. 15 (201). A time slot first detected is sought and used as time slot a1 (202). Next, starting from the time slot at the position a1+1, the time slot idle/busy map is searched in the order of increasing number (203) to hunt for the first available idle time slot and use it as time slot a2 (204), if the idle time slots a1 and a2 preserve the sequence integrity of multi-slot information in a frame. Thereafter, the time slot numbers a1 and a2 are read to execute a path connection (205). In addition, the idle/busy state bits corresponding to time slots a1 and a2 in the idle/busy map 80 are changed from "1" to "0".

Figures 16, 17:
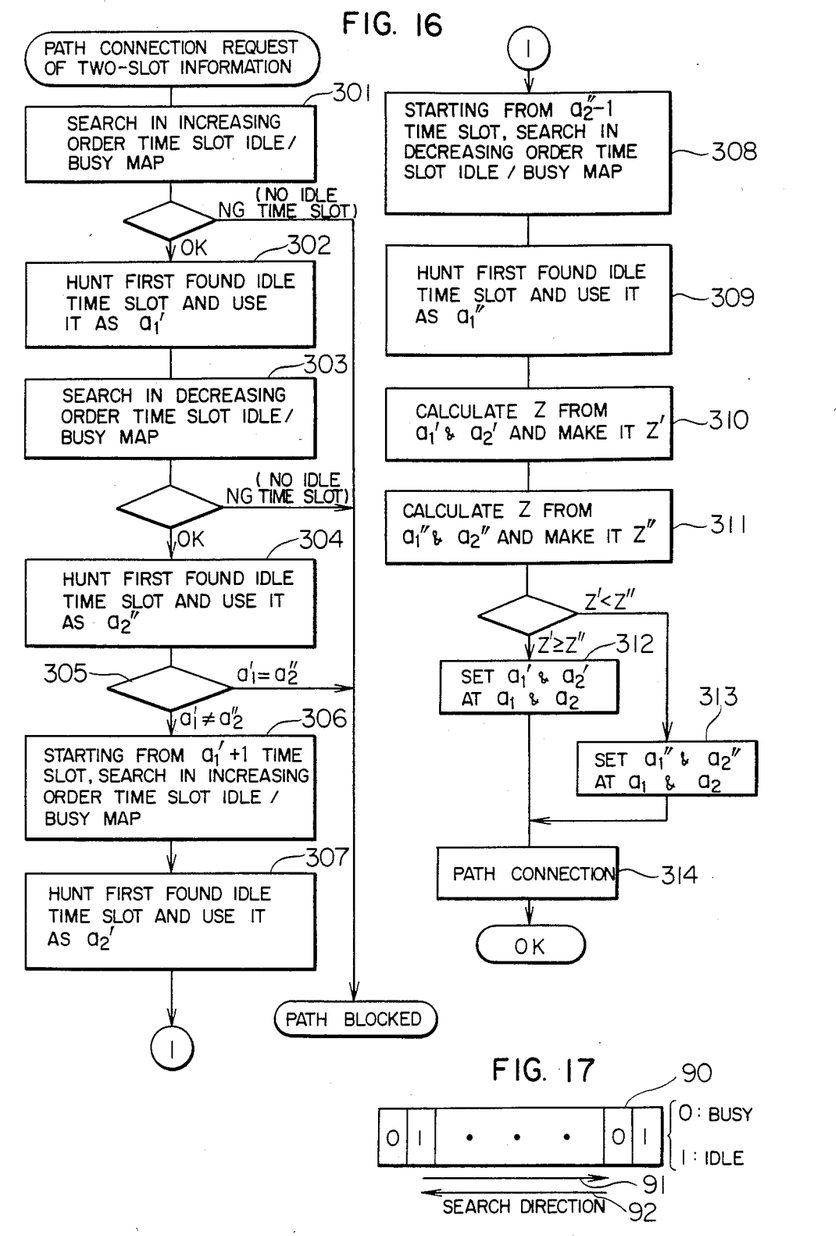
FIG. 16 is a flow chart showing a time slot selecting method accoring to a third embodiment of the present invention.
FIG. 17 shows an example of a time slot idle/ busy map with a search direction indicated, which map is used with the control shown in FIG. 16.

The third method, shown in the flow chart of FIG. 16, is an improved version of the first method, wherein incoming time slots are selected so as to make the interval between time slot numbers a1 and a2 narrower, and position them remote from the center time slot of the frame. Particularly, first a time slot idle/busy map shown in FIG. 17 is searched in the order of increasing number in the search direction 91 indicated by 90' (301). An idle time slot first detected is detected and used as time slot a1' (302).

Next, the time slot idle/busy map is searched in the order of decreasing number in the search direction 92 indicated by 90 to hunt for a first detected time slot and use it as time slot a2'' (304). The time slots a1' and a2' are compared, and if they coincide with each other, it means that only one idle time slot exists. Therefore, the path is considered to be blocked and the control terminates (305). If not coincident, starting from the time slot a1'+1 in the order of increasing number, and starting from the time slot a2''−1 in the order of decreasing number, the idle/busy map is searched to hunt for time slots and use them as time slots a2' and a1'' (306), (307), (308), (309). As a result, two time slot combinations (a1', a2') and (a1'', a2'') are obtained. Next, the number Z of the combination a1' and a2' is calculated using the equation (1) and represented by Z' (310). Similarly, Z'' is calculated from the combination a1'' and a2'' (311). Comparing Z' and Z'', and if Z' is larger, combination a1' and a2' is set at combination a1 and a2 (312). If Z'' is larger, combination a1'' and a2'' is set at combination a1 and a2 (313). Finally, a path connection of time slots a1 and a2 is conducted (314). In addition, the idle/busy bits corresponding to time slots a1 and a2 of the idle/busy map 90 are changed from "1" to "0".

In FIG. 16, a check processing for preserving the sequence integrity of multi-slot information in a frame in the upstream time division switch is omitted.

The embodiment of the time slot selecting method in a two-slot information connection process has been described. The present invention is advantageously applicable to an n-slot information connection process by obtaining an equation (in case of two-slot information, the equation (1) solving the relationship between incoming time slots and the number of combinations of an ougoing time slot group, similarly to the above methods.

As described so far, according to the present invention, outgoing time slots at an upstream time division switch are selected in such a manner that the number of combinations of a time slot group selectable by a downstream time division switch, becomes large. Therefore, the range of selecting time slots by a downstream time division switch can be broadened and the path blocking rate can be reduced advantageously.

What is claimed is:

1. A time slot selecting method in a time division switching network having time division switches connected in tandem and in multi-stage, in which:
    a controller associated with an upstream time division switch receives a path connection request of multi-slot information;
    said controller selects in priority idle time slots in such a manner that the number of combinations of time slots, associated with the multi-slot number and selectable by a downstream time division switch, becomes large; and
    connects a path of said upstream time division switch in accordance with the selected time slots.

2. A time slot selecting method in a time division switching network having time division switches connected in tandem and in multi-stage, in which:
    when a controller associated with an upstream time division switch receives a path connection request of multi-slot information, said controller searches an idle/ busy map previously made to store combinations of outgoing time slots associated with the multi-slot number;
    selects idle time slots from said map in such a manner that the number of combinations of time slots selectable by a downstream time division switch, becomes large; and
    connects a path of said upstream time division switch in accordance with the selected time slots.

3. A time slot selecting method in a time division switching network having time division switches connected in tandem and in multi-stage, in which:
    when a controller associated with an upstream time division switch receives a path connection request of multi-slot information, said controller searches in the order of time slot, a time slot idle/busy map, and selects a first idle time slot from said map to use said idle time slot as a first time slot;
    next searches said map starting from the next time slot of said selected first idle time slot to select a next idle time slot and use said next idle time slot as a second time slot; and
    connects a path of said upstream time division switch in accordance with said first and second time slots.

4. A time slot selecting method in a time division switching network having time division switches connected in tandem and in multi-stage, in which:
    when a controller associated with an upstream time division switch receives a path connection request of multi-slot information, said controller searches in the order of increasing time slot number a time slot idle/busy map to select from said map an idle time slot and use said idle time slot as a first time slot, and further searches a next idle time slot in the order of increasing time slot number starting from the time slot next to the first time slot, to select said next idle time slot as a second time slot;
    searches said time slot idle/busy map in the order of decreasing time slot number to select a first idle time slot and use the latter first idle time slot as a third time slot, and further searches a next idle time slot in the order of decreasing time slot number starting from the time slot next to said third time slot to select said next idle time slot as a fourth time slot;

selects either the combination of said first and second time slots or the combination of said third and fourth time slots, which makes larger the number of combinations of time slots selectable by a downstream time division switch; and connects a path of said upstream time division switch in accordance with said selected time slot combination. nation.

5. A time slot selecting equipment for use by a first upstream switch in a time division switching network having time division switches connected in tandem and in multi-stage, comprising:

a controller responsive to a path connection request of multi-slot information by selecting idle time slots in accordance with a predetermined time slot selecting order such that the number of combination of time slots selectable by a second downstream switch, becomes large; and a time division switch for connecting time slots of incoming and outgoing highways in accordance with information on the time slots selected by said controller.

6. A time slot selecting equipment according to claim 5, wherein said controller comprises:

means for storing a combination map of time slots associated with the multi-slot number and formed previously, together with idle/busy information of the combination of said time slots; and means for searching the idle/busy state of a combination of each time slots in said map and selecting idle time slots.

7. A time slot selecting equipment according to claim 5, wherein said controller comprises:

means for searching a time slot idle/busy map in the order of time slot and selecting a first idle time slot as a first time slot; and means for searching said map from the time slot next to said first time slot and selecting a next idle time slot as a second time slot.

8. A time slot selecting equipment according to claim 5, wherein said controller comprises:

means responsive to a path connection request of multi-slot information for searching in the order of increasing time slot number a time slot idle/busy map and selecting a first idle time slot from said map and using said first idle time slot as a first time slot, and searching a next idle time slot in the order of increasing time slot number starting from the time slot next to said first time slot to select said next idle time slot as a second time slot;

means for searching said time slot idle/busy map in the order of decreasing time slot number to select a first idle time slot as a third time slot, and further searching a next idle time slot in the order of decreasing time slot number starting from the time slot next to said third time slot to select said next idle time slot as a fourth time slot; and means for selecting either the combination of said first and second time slots or the combination of said third and fourth time slots, which combination makes larger the number of combinations of a time slot group selectable by a downstream time division switch.

9. A time slot selecting equipment according to claim 5, wherein said controller comprises means for selecting in priority time slots whose interval between time slots is short.

10. a time slot selecting equipment according to claim 5, wherein said controller comprises means for selecting in priority time slots whose interval between time slots is short and whose time slot is located remotely from a center time slot of the frame.

* * * * *